United States Patent [19]
Jones et al.

[11] Patent Number: 6,146,669
[45] Date of Patent: *Nov. 14, 2000

[54] METHOD FOR PROCESSING OILSEED MATERIAL

[75] Inventors: Alison M. Jones, Minnetonka; Michael A. Porter, Maple Grove; Dean A. Duncan, Mound; Michael D. Kluetz, Maple Plain, all of Minn.

[73] Assignee: Cargill Incorporated, Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/078,830

[22] Filed: May 14, 1998

[51] Int. Cl.$^7$ .............................. A23K 1/18; A23L 1/211

[52] U.S. Cl. ............................ 426/53; 426/635; 426/807
[58] Field of Search .................................. 426/635, 807, 426/53

[56] References Cited

U.S. PATENT DOCUMENTS

| | | | |
|---|---|---|---|
| 3,640,725 | 2/1972 | Sherba et al. | 99/17 |
| 3,718,479 | 2/1973 | Kanno et al. | 99/17 |
| 3,857,971 | 12/1974 | Abdo et al. | 426/53 |
| 5,312,630 | 5/1994 | Pfaff | 426/46 |

FOREIGN PATENT DOCUMENTS

| | | |
|---|---|---|
| 05268881 | 10/1993 | Japan . |
| 1485502 | 9/1977 | United Kingdom . |
| 1550703 | 8/1979 | United Kingdom . |

OTHER PUBLICATIONS

Anderson, R. et al., "Compositional Changes in Trypsin Inhibitors, Phtytic Acid, Saponins and Isoflavones Related to Soybean Processing", *American Institute of Nutrition*, Supplement pp. 581S–588S (1995).

Antony, U. et al., "Effect of Fermentation on the Primary Nutrients in Finger Millet (*Eleusine coracana*)", *J. Agric. Food Chem.*, 44:2616–2618 (1996).

Cook, P., "Fermented foods as biotechnological resources", *Food Research International*, 27:309–316 (1994).

Demetrakakes, P., "Quality for the ages", *Food Processing*, pp. 61–62; 65–66 (Sep. 1996).

de Reu, J. et al., "Protein Hydrolysis during Soybean Tempe Fermentation with *Rhizopus oligosporus*", *J. Agric. Food Chem.*, 43:2235–2239 (1995).

Duszkiewicz–Reinhard, W. et al., "Reduction of Stachyose in Legume Flours by Lactic Acid Bacteria", *Jour. of Food Sci.*, 59:115–117 (1994).

Ebine, H., "Fermented Soybean Foods", Asian Conference, No. 10 (1976).

Ebune, A. et al., "Effects of Phosphate, Surfactants and Glucose on Phytase Production and Hydrolysis of Phytic Acid in Canola Meal by *Aspergillus ficuum* During Solid–State Fermentation", *Bioresource Technology*, 54:241–247 (1995).

Ebune, A. et al., "Production of Phytase During Solid State Fermentation Using *Aspergillus ficuum* NRRL 3135 in Canola Meal", *Bioresource Technology*, 53:7–12 (1995).

Efiuvwevwere, B. et al., "Influence of Fermentation Time and an "Indigenous Tenderiser" (Kanwa) on the Microbial Profile, Chemical Attributes and Shelf–Life of Rice Masa (a Nigerian Fermented Product)", *J. Sci. Food Agric.*, 71:442–448 (1996).

Frias, J. et al., "Natural Fermentation of Lentils. Influence of Time, Flour Concentration, and Temperature on the Kinetics of Monosaccharides, Disaccharide, and α–Galactosides", *J. Agric. Food Chem.*, 44:579–584 (1996).

Fukushima, D., "Soy Proteins for Foods Centering around Soy Sauce and Tofu", *JAOCS*, pp. 346–354 (Mar. 1981).

Golbitz, P., "Traditional Soyfoods: Processing and Products", *American Institute of Nutrition*, Supplement, pp. 570S–572S (1995).

Hachmeister, K. et al., "Tempeh: A Mold–Modified Indigenous Fermented Food Made from Soybeans and/or Cereal Grains", *Critical Reviews in Microbiology*, 19(3):137–188 (1993).

Han, Y. et al., "Traditional Korean Fermented Foods (Review).", *Chem. Mikrobiol. Technol. Lebensm.*, 15 (5/6):150–160 (1993).

Kim et al., "Taste Components of Soy Sauce Manufacturing by Bacillus Species SSA3–2M1 and Fused ST723–F31", *Jour. of Microbio. and Biotech.*, 6:202–208 (1996).

Kim et al., Volatile Components in the Soy Sauce Manufactured by Bacillus Species and Fused Yeast, *Jour. of Microbio. and Biotech.*, 6:194–201 (1996).

Kumar, G. et al., "The effects of temperature and manganese on the natural fermentation of whole wheatflour", *Food Microbiology*, 13:149–157 (1996).

Liu, K., "Fermented Oriental Soyfoods", *SOYBEANS Chemistry, Technology, and Utilization*, pp. 273–281 (1997).

Luh, B., "Industrial production of soy sauce", *Journal of Industrial Microbiology*, 14:467–471 (1995).

Maia, A. et al., "Protection of the Intracellular Trehalose Content by Corn and Soy Flours in Alcohol Fermentaion", *Biotechnology Letters*, 15:715–720 (Jul. 1993).

Maruo, B. et al., "Industrial Application of *B. subtilis*", *Bacillus subtilis: Molecular Biology and Industrial Application*, pp. 143–161 (1989).

(List continued on next page.)

*Primary Examiner*—Chhaya D. Sayala
*Attorney, Agent, or Firm*—Merchant & Gould P.C.

[57] ABSTRACT

A method for preparing the high protein nutrient from oilseed-based material is provided. The modified oilseed-based material produced by the process can be utilized in a wide variety of applications, including the preparation of fermentation media and the production of animal feeds, such as pet foods and related feeds for young animals. The oilseed-based product typically includes at least about 55 wt. % protein (dry basis) and low levels of soluble sugars, such as raffinose, stachyose and saccharose. Animal feeds which include the modified oilseed material are also provided.

23 Claims, 5 Drawing Sheets

OTHER PUBLICATIONS

Mitra, P. et al., "Production of Proteolytic Enzymes by Solid State Fermentation—An Overview", *Jour. of Sci. & Ind. Research,* 55:439–442 (May–Jun. 1996).

Nout, M., "Fermented foods and food safety", *Food Research International* 27:291–298 (1994).

Ohta, T. et al., Manufacturing New–type Fermented Soybean Food Product Employing *Bacillus natto* Parts 1 & 2, *Report of the Food Research Institute No. 18,* (Mar. 1964). (With English Abstract).

Prescott, et al., "NATTO", *Ind. Microbiology,* 4th Ed. pp. 520–521 (1982).

Röling, W. et al., "Comparison between Traditional and Industrial Soy Sauce (Kecap) Fermentation in Indonesia", *Journal of Fermentation and Bioengineering,* 81:275–278 (1996).

Ruiz–Terán, F. et al., "Chemical and Enzymic Changes During the Fermentation of Bacteria–Free Soya Bean Tempe", *J. Sci Food Agric.,* 71:523–530 (1996).

Wang, H. et al., "Isoflavone Content in Commercial Soybean Foods", *J. Agric. Food Chem.* 42:1666–1673 (1994).

Wattanapat, R. et al., "Kinetics of Acid Hydrolysis of Defatted Peanut Flour", *Jour. of Food Sci.,* 59:621–625 (1994).

Rozan, P. et al., "Detoxication of rapeseed meal by *Rhizopus Oligosporus* sp–T3: A first step towards rapeseed protein concentrate", *Intern. Jour. of Food Sci. and Tech.* 31:85–90 (1996).

Chompreeda, P. et al., "Effects of Heat and Natural Fermentation on Amino Acids, Flatus Producing Compounds, Lipid Oxidation and Trypsin Inhibitor in Blends of Soybean and Cornmeal", Journal of Food Science, Vol. 49, No. 2, pp. 563–565 (Mar.–Apr. 1984).

Tsen, H. Y. et al., "Changes of Enzymic Activities and Biochemical Constituents During the Fermentation of Defatted Soybean Meal with Rhizopus Thailandensis", Journal of the Chinese Agricultural Chemical Society, Vol. 23, No. 3/4, Abstract only (1985).

Rexen, B., "APPLICATION OF ENZYMES IN FEEDSTUFF INDUSTRY", Role and Utilization of Enzymes, 4,2,3, (1979).

Wang, H. et al., "Oriental Fermented Foods", Industrial Microbiology, pp. 492–538 (1982).

METHOD FOR PROCESSING OILSEED MATERIAL

BACKGROUND OF THE INVENTION

The latent nutritional values present in many vegetables, particularly the oilseed vegetables such as soybeans and other legumes and cottonseeds, is well known. Utilization of these nutrient sources has been severely hampered, however, by the presence in these vegetable nutrients of naturally occurring substances that interfere with their digestibility and palatability. The principal deficiencies of vegetable nutrient sources are their typical beany flavor and their poor digestibility. The beany flavor, particularly when used as an animal feed can often be overcome by cooking or toasting. However, the poor digestibility of vegetable nutrients, such as soy protein, is caused by the presence of oligosaccharide sugars and additional antinutritional factors, such as trypsin inhibitor and proteins that show antigenicity. Finally, since these crude feedstock materials are products of the agricultural and food processing industries, their consistency and/or quality can be variable.

The oligosaccharide sugars are considered to be antinutritional factors, because they can cause flatulence. This flatulence typically results in discomfort, diarrhea, loss of appetite, poor growth, and in the case of young animals can even result in death. These effects have in part been responsible for the lack of wide-scale use of vegetable nutrients as milk replacements for human and animal consumption.

Antigenic proteins present in oilseeds are believed to interfere with or slow down the growth rate of young animals. The antigenic factors are generally associated with the presence of glycinin, betaconglycinin, lectin and urease that occur naturally in vegetable nutrients such as soy beans and cottonseed. In young animals, the presence of these substances typically results in diarrhea, poor growth and may even lead to mortality.

Vegetable nutrients such as oilseed based products and soy products, in particular, also typically contain factors which inhibit the natural digestive action of the trypsin enzyme in the intestine. While these trypsin inhibiting factors may be reduced to lower levels by heat treatment, such heat treatments are not always effective or desirable.

SUMMARY OF THE INVENTION

The present invention relates to the preparation of high protein content nutrient products from oilseed materials. The protein content of the modified oilseed material produced by the present method is typically increased by at least about 5 to 10 wt. % relative to the initial unmodified material. Defatted oilseed materials, such as defatted soybean flake, soybean meal and related defatted soybean products, are particularly suitable for use in producing the modified high protein products of the present invention. As used herein, the term "defatted oilseed material" refers to oilseed material which has been processed to reduce the fat content by at least about 80%. The defatted oilseed material employed in the present process typically has a fat content of no more than about 5 wt. % and preferably no more than about 3.0 wt. % (dry basis). The modified high protein products can be utilized in a wide variety of applications, including the preparation of fermentation media and the production of animal feeds, such as pet foods and related feeds for young animals.

The present invention also relates to a method for preparing the high protein nutrient from oilseed-based material. The method provides an oilseed derived high protein material having very low levels of soluble sugars and, if desired, low levels of fat. Although less preferred, the same method may also be employed using an oilseed flake or granular oilseed material completely retaining its natural oil constituents. The modified oilseed product produced by the present method has a protein content which is at least about 5 wt. % (dry basis) higher than the original unmodified material and typically includes at least about 55 wt. % and, preferably at least about 60 wt. % or higher protein (dry basis). The present method can be used to produce high protein modified oilseed products which have extremely low levels of soluble sugars (e.g., raffinose, stachyose and saccharose) and oil. The fiber content of the high protein modified oilseed products produced by the present method is generally quite similar to the fiber content of the oilseed material prior to treatment.

The oilseed-based high protein product produced by the present method can be used as a nutrient in a wide variety of applications. The oilseed-based high protein product is especially suitable for use as a protein source in animal feeds, such as pet foods and related feeds formulated for young animals. The animal feed is typically formulated to include other materials such as energy source(s), mineral source(s), vitamin source(s), and/or additional protein source(s). Typically energy sources which may be incorporated in the animal feed include carbohydrate sources, vegetable oil(s), tallow, and/or lard. The modified oilseed product may also be used in foods for human consumption, of which such foods could include the following: baby food, protein rich beverages, meat imitations, sausages, imitation cheese and the like. The amount of modified oilseed product added to the food product is dependent upon the food product formulation. There are generally no constraints to the amount employed.

The present method for preparing a protein-containing nutrient includes incubation of a culture medium which includes oilseed-based material. Throughout this application, the terms "fermentation" and "incubation" are used interchangeably. The culture medium typically includes defatted oilseed material as the primary raw material. During the incubation step, the oilseed material is converted into a high protein nutrient through a process which includes microbial fermentation of the material. The fermentation process is be carried out under incubation conditions which favor certain of the indigenous microbial population present in the oilseed material. Alternatively, the material may be inoculated with an isolated source of similar microbes. In commercial production, the use of the latter approach may be preferable to increase control and reproducibility of process parameters and product specifications. The method present can be used to produce a modified oilseed product which has at least about 55 wt. % protein and a relatively low FAN content (e.g., no more than about 5 mg/g). If desired, by incubating the oilseed material for longer periods of time, modified oilseed products with substantially higher FAN contents (e.g., FAN levels of 15 mg/g or higher) can be produced. Free amino nitrogen ("FAN") is a measure of the quantity of readily available amino nitrogen, and refers specifically to small peptides, amino acids, and ammonia.

The modified oilseed product produced by the present method typically has very low levels of oil and soluble sugars (e.g., saccharose, stachyose and raffinose). The fiber content and amount of isoflavones in the material are generally relatively close to the corresponding levels present in the original unfermented oilseed material. The present process of modifying an oilseed product typically produces a material which contains low levels of antinutritional factors (e.g., trypsin inhibitors) and antigenicity factors.

DETAILED DESCRIPTION

Figure 1:
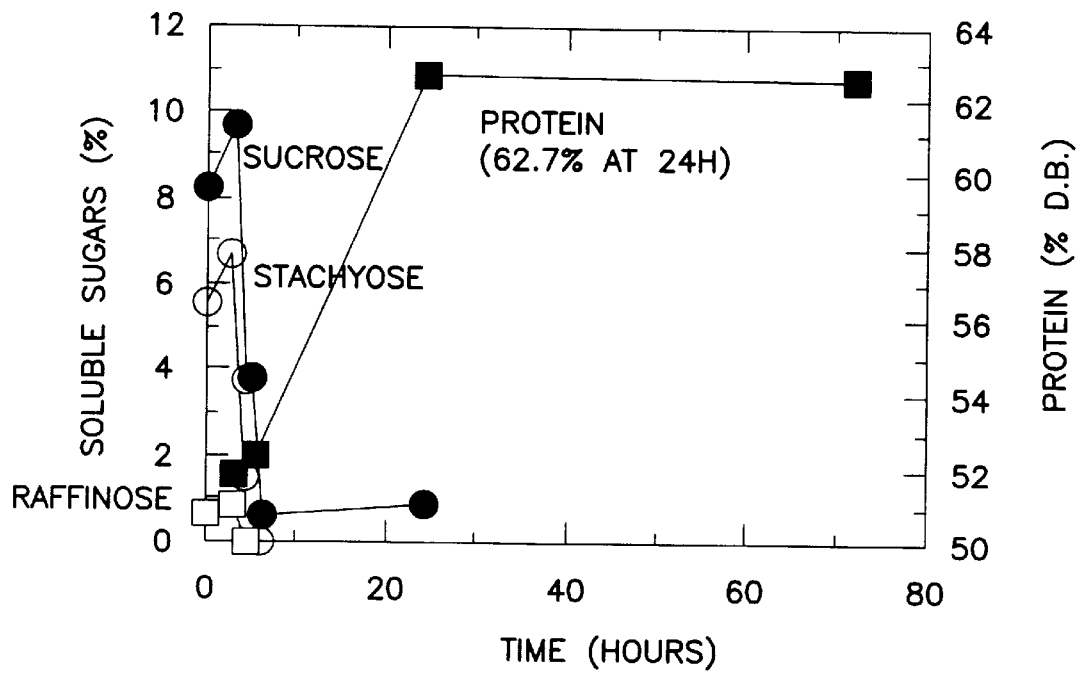
FIG. 1 is a graph showing the rates of soluble sugar utilization and increase in protein content during the incubation of a 25 g batch of soybean meal at 40° C. and 45% moisture content.

The present invention provides a method of converting oilseed material, such as defatted soybean white flakes or soybean meal, into a high protein content material which has very low levels of soluble sugars (typically no more than about 0.5 wt. %). The modified oilseed material provided by the method is particularly suitable for use as a protein source for incorporation into feed formulations for pets and young animals.

The method includes incubating a culture medium which is made up primarily of oilseed derived material (e.g., at least about 90 wt. % on a dry basis) under aerobic conditions. The incubation is preferably conducted under conditions that allow sporeforming bacteria in the inherent microbial population to dominate the fermentation. The incubation conditions are preferably maintained to favor fermentation by a microbial population that produces a fermentation product having a substantially neutral pH (e.g., a pH of about 6.0–7.5). If conditions are allowed to become anaerobic, lactic acid fermentation by lactobacilli can result in a more acidic endproduct. This is preferably avoided along with other conditions which would favor yeast fermentation or lactic acid fermentation by lactobacilli. Examples of incubation conditions to be avoided if possible include high moisture content in the culture medium, anaerobic fermentation and other conditions which would favor lower pH fermentation conditions.

It may be advantageous to be able to carry out the fermentation process using solely the indigenous microbial population present in the oilseed material. It has been found that the microbes naturally present in an oilseed material, such as soybean meal, which are capable of producing the desired product of the invention typically include sporeforming bacteria. While the spore forming bacteria have not been completely characterized, it is known that the spores can be activated and used to carry out the present oilseed fermentation even after pasteurization and/or ethylene oxide treatment. If desired, this fact can be used to limit possible contamination by other organisms which are known to be killed by such treatments. While not conclusively established, it is believed that the spore forming bacteria responsible for the present process include Bacillus strains and, likely, strains of Bacillus subtilis.

Microbial Inoculate

Alternatively, the material may be inoculated with an isolated source of similar microbes. In commercial production, the use of the latter approach may be preferable as a means of increasing the control and reproducibility of the process parameters and product specifications. In addition, it has been found that "seeding" the culture medium with a dried seed inoculum (e.g., a portion of oilseed meal previously modified according to the present method) can stimulate the rate of protein increase during the fermentation process. The use of dried "seed meal" is, however, typically associated with a lag period before which the sporeforming bacilli become sufficiently active to promote the biological modification of fresh oilseed material. The initial fermentation rate can generally be stimulated even further if the culture medium is seeded with a "live" microbial source (also referred to herein as a "viable" or "activated" microbial source or as a "live" inoculate). A live microbial source can be conveniently produced by incubating an oilseed material, such as soybean meal, at a temperature of 25° C. to 60° C. and a moisture content of 30 to 60 wt. % for a length of time sufficient to stimulate the growth of spore forming bacteria in the indigenous microbial population of the material. The use of a "live" inoculum can reduce the lag time associated with spore germination leading to a subsequent increase in the rate of raising the protein content of the culture medium. This can significantly reduce the fermentation time required to achieve maximum protein concentration in the medium. Thus, it appears that incorporating a live ("active") seed meal can increase the initial rate of the fermentation process and shorten the overall incubation time.

To ensure that the desired microbial population in a "seed" inoculate is selected for, the seed material must be carefully chosen. For example, it has been observed that a dried seed inoculum obtained from soybean meal, which was allowed to ferment with the indigenous microbial population until a final pH of 5.9 was obtained, was inhibitory to the present biological modification process. In contrast, modified soybean meal produced by the present process having a final pH in the range of 7.0 to 7.5 is particularly effective in stimulating the rate of protein increase compared to that observed with unseeded soybean meal. These results confirm that while inoculating the oilseed material prior to processing is desirable, care must be taken in the choice of "seed material" in order to successfully produce a modified soybean meal by the present biological modification method.

If desired, the sporeforming portion of the indigenous microbial population present in oilseed material being fermented according to the present method can be isolated using standard microbiological techniques. The resulting "seed microbial sample" (also referred to as a "seed microbial source") may conveniently be stored in its spore form.

As indicated above, it is generally advantageous to activate the seed microbial spores (e.g., via incubation with a small portion of moistened oilseed meal or an appropriate aqueous culture medium) prior to inoculating a culture medium containing fresh unfermented oilseed material.

Source of Oilseed Material

The culture medium employed in the incubation step of the present method generally includes material derived from defatted oilseed material. The fat may be substantially removed from dehusked oilseeds by a number of different methods, e.g., by simply pressing the dehusked seeds or by extracting the dehusked seeds with an organic solvent, such as hexane. The defatted oilseed material which is employed in preferred embodiments of the present process typically contains no more than about 3 wt. % and, preferably, no more than about 1 wt. % fat. The solvent extraction process is typically conducted on dehusked oilseeds that have been flattened into flakes. The product of such an extraction is referred to as an oilseed "white flake." For example, soybean white flake is generally obtained by pressing dehusked soybeans into a flat flake and removing a substantial portion of the residual oil content from the flakes by extraction with hexane. The residual solvent can be removed from the resulting "white flake" by a number of methods. In one procedure, the solvent is extracted by passing the oilseed white flake through a chamber containing hot solvent vapor. For example, residual hexane can be removed from soybean white flakes by passage through a chamber containing hexane vapor at a temperature of at least about 75° C. Under such conditions, the bulk of the residual hexane is volatilized from the flakes and can subsequently be removed, e.g., via vacuum. The material produced by this procedure is referred to as flash desolventized oilseed white flake. The flash desolventized oilseed white flake is then typically ground to produce a granular material ("meal") of which at least about 95 wt. % has a mesh size larger than about 100 mesh and, preferably about 8 to about 80 mesh. If desired, however, the flash desolventized oilseed white flake may be used directly in the incubation step of the present method. The low shear mixing typically employed during the incubation step tends to crumble the flakes into a granulated material having a particle size similar to that of the meal which is produced by grinding flash desolventized oilseed white flake.

Another defatted oilseed derived material which is suitable for use in the present process is derived from material obtained by removing the hexane from the oilseed white flake by a process referred to as "toasting." In this process, the hexane extracted oilseed white flakes are passed through a chamber containing steam at a temperature of at least about 105° C. This causes the solvent in the flakes to volatilize and be carried away with the steam. The resulting product is referred to as toasted oilseed flake. As with flash desolventized oilseed white flake, toasted oilseed flake may be used directly as the culture medium in the incubation step of the present method.

While the desolventized oilseed white flake may be used directly as culture medium in the incubation step, more commonly the desolventized flake is ground to a meal (e.g., where at least about 95 wt. % of the material has a mesh size of about 8 to about 80) prior to being employed as culture medium. Oilseed meals of this type, such as soybean meal, are used in a wide variety of other applications and are readily available from commercial sources. Other examples of oilseed materials which are suitable for use in the culture medium include canola meal, sunflower meal, cottonseed meal, peanut meal, lupin meal and mixtures thereof. Oilseed materials derived from defatted soybean and/or defatted cottonseed are particularly suitable for use in the present method since such material has a relatively high protein content.

Incubation Processing Parameters

It has been found that the efficacy of the present method is enhanced if the aeration, temperature and moisture content of the culture medium are carefully controlled during the incubation process. The fermentation is carried out aerobically. When the culture medium is in the form of a relatively thick bed of oilseed material (e.g., several inches or more thick), it is particularly important the material be mixed sufficiently to allow oxygen-containing gas, typically air, to come into contact with the active microbial population. This is best achieved by mixing the oilseed material in a low shear manner. Preferably, the culture medium is mixed under low shear such that the mixture does not develop a paste-like consistency, but retains a granular nature.

In addition to maintaining access of the active microbial population to air, mixing the culture medium helps to distribute heat and control the temperature of the fermenting material as well as to maintain a relatively uniform moisture content in the medium. The aeration of the incubating oilseed material may tend to dry out the material and lower the moisture content of the incubating material below the desired minimum level of 30 wt. % moisture content. In order to avoid this, a humidified oxygen-containing gas may be passed through the head space of the incubation vessel. The humidified gas is typically moisturized to have relative humidity of at least about 60% and preferably at least about 80%.

It has also been found that if the shear induced by mixing the material is too great (e.g., too high a rate of mixing), the oilseed material tends to "agglomerate" and become more acidic during processing. It is generally preferable to mix the incubating material in a manner which "turns over" the material at a relatively slow rate. In addition, the material does not typically need to be mixed in a continuous fashion in order to maintain the desired aeration, moisture and temperature conditions. As demonstrated by the experiments described in Example 2 herein, gentle mixing ("turning over") of the incubating material in an intermittent fashion is generally sufficient to aerate the material and maintain temperature and moisture content at desirable levels.

The present fermentation method is typically controlled to maintain a temperature of about 25° C. to about 60° C. and a moisture content (water content as wt. % of the total weight of the culture medium) of about 30 to about 60 wt. %. The fermentation is typically allowed to run in the presence of oxygen for a time sufficient to form a modified oilseed meal having a protein content of at least about 60 wt. % (dry basis). Where the modified oilseed material produced by the process is to used as an animal feed supplement, the FAN level is preferably monitored and fermentation is stopped before a FAN level of no more than about 5 mg/g and, preferably, no more than about 3 mg/g is achieved. Thus, while in some instances higher protein contents may be achieved by allowing the fermentation to proceed for longer times, it may be preferable to monitor and stop fermentation based on a targeted FAN level.

Although the present incubation process may be carried out at relatively low temperatures, e.g., about 30° C. or slightly higher, the fermentation is typically carried out at a temperature of at least about 40° C., and preferably at about 45° C. to about 55° C. There are a number of advantages of operating the fermentation at these temperatures. The chances of complications due to growth of other competing organisms is lessened somewhat at higher temperatures. In addition, at higher temperatures, the reaction generally proceeds at a faster rate allowing more efficient utilization of process equipment. If fermentation is carried out at too high a temperature, however, typically at about 60° C. or above, the growth of the desirable microbial population may be negligible. It may be possible, however, using standard selection techniques to identify mutant spore forming bacillus strains which are capable of growing and effectively carrying out the present microbial modification of oilseed material at temperatures of 60° C. and above.

As noted above, the moisture content of the culture medium is generally maintained at about 30 to about 60 wt. % during the fermentation. Some water must be present in order to prevent the microbial population from going into its spore form. If too much water is present in the medium, however, lactic acid fermentation by lactobacilli can increase and start to lower the pH of the medium. Such a lowering of the culture medium pH can shut down the growth of the desirable portion of the microbial population. It has been found that a oilseed material with a moisture content of about 40 to 50 wt. % is quite suitable as a culture medium for the present fermentation.

Attributes of Modified Oilseed Product

The protein content of the modified oilseed material produced after incubation under the conditions described herein is typically increased by at least about 5 to 10 wt. % relative to the initial unmodified material. The modified oilseed material produced after incubation under the conditions described herein typically includes at least about 55 wt. % protein on a dry basis and has a very low level of soluble sugars. In a preferred embodiment, incubation is monitored and stopped at a point where the FAN content of the modified oilseed material is no more than about 5 mg/g and, preferably, no more than about 3 mg/g. The increase in protein content and concomitant decrease in soluble sugar level occurs during the initial stage of the incubation without a substantial increase in FAN content. As noted above, higher FAN levels can generally be obtained by allowing the incubation to proceed for longer periods of time. Even though the FAN content remains relatively low, the total level of soluble sugars is typically decreased to no more than about 1.0 wt. %, preferably no more than about 0.5 wt. %, and more preferably no more than about 0.2 wt. % of the oilseed material (on a dry basis). The reduction in the amount of stachyose in an oilseed material which typically occurs during the present incubation step is particularly notable. For example, the amount of stachyose in a defatted oilseed meal such as soybean meal can be decreased from commonly observed levels of 6–8 wt. % (dry basis) to no more than about 0.5 wt. % and, preferably, no more than about 0.2 wt. % by the present biological modification.

During the incubation step, while the levels of some components of the oilseed material are altered considerably, the ash content, fiber content and total level of phosphorus in the material remain relatively unchanged. Thus, if the oilseed material is substantially made up of material derived from defatted soybean flakes, the modified product obtained from the incubation process typically has an ash content of about 5 to about 7 wt. %, and a fiber content of about 2 to about 3.5 wt. % (on a dry basis). The fat content of the oilseed material also does not generally change substantially during the incubation. For example, incubation of defatted oilseed material, such as soybean meal, can produce a modified oilseed product having a protein content of 60 wt. % or greater and no more than about 3 wt. % and preferably, no more than about 2 wt. % fat. As used herein, the term "fat" refers to triacylglycerols.

If the incubation is stopped at a point where the FAN content of the oilseed material is still below about 5 mg/g, the average molecular weight of the protein is generally decreased to some degree. This is reflected in an increase in the percentage of the protein which is soluble after autoclaving the modified material for 15 minutes. For example, soybean meal typically has a protein solubility in a pH 5 aqueous solution of about 15%. Modified soybean meal obtained from incubation under conditions that produces a FAN content of about 1 to about 5 mg/g generally has a protein solubility after autoclaving of about 5 to 30% (at pH 5). Soybean meal modified in this manner typically has a viscosity of about 200 to about 400 cps as an autoclaved 20 wt. % solids pH 5 aqueous solution and about 700 to about 900 cps as an autoclaved 20 wt. % solids pH 7 aqueous solution.

While the level of soluble phosphorus (as a percentage of total phosphorus) may increase somewhat from the original level, if the incubation is stopped at a point where the FAN content is no more than about 5 mg/g, the level of soluble phosphorus is generally below about 40% (as a percentage of total phosphorus).

It has also been established that incubation of an oilseed material, such as soybean meal, under the conditions of the present method can substantially decrease the levels of antinutritional factors in the material. Thus the level of trypsin inhibitors present in an oilseed material such as soybean meal is generally decreased by at least about 50% (e.g., from about 4,000 TIU/g to no more than about 2,000 TIU/g in the biologically modified oilseed material). The levels of other antinutritional factors, such as soy lectins, soy antigenicity factors and glycinin are also typically substantially reduced during the incubation step.

While the levels of detrimental factors such as these may be substantially decreased, the levels of some beneficial components in the oilseed material may be maintained during the incubation step. For example, the total isoflavone content as well as the amounts of vitamin $B_6$ and vitamin $B_{12}$ are generally maintained at about their original levels during incubation.

Post Incubation Processing

After forming the modified oilseed product, it is typically advisable to pasteurize the material to ensure that microbial activity is minimized. The modified oilseed product may be pasteurized, e.g., by raising the internal temperature of the product to about 75° C. or above and maintaining that temperature for about 10–15 minutes. The material is generally dried to some extent by the pasteurization process. To improve its storage properties, the modified oilseed product is typically dried such that the product contains no more than about 15 wt. % moisture, and preferably, about 8 to about 12 wt. % moisture, based upon the weight of the final dried product. Preferably, the dried product is then ground into free-flowing solid particles in order to facilitate handling and packaging. For example, the dried, modified oilseed product is typically ground such that at least about 95 wt. % of the material is in the form of particles having a size of no more than about 10 mesh.

For some applications, it may be advantageous to produce a totally soluble protein source. This may be achieved by extracting soluble material in the biologically modified oilseed material produced by the present method into an aqueous solution. Such an extract typically has an even higher overall protein level than the crude modified oilseed product. The fiber content of the extract is substantially lower than the crude biologically modified oilseed material. The oilseed derived nutrient which is obtained through such an aqueous extraction is essentially completely soluble in water. As with the modified oilseed product, the extract is generally dried to a moisture content of no more than about 15 wt. % moisture and ground to form a granulated material, e.g., a powder in which at least about 95 wt. % of the particles have a particle size of no more than about 10 mesh. The dried extracts produced in this manner can have an overall protein content of 70 wt. % or higher.

Process Equipment and Design

The present method can be carried out using a variety of conventional apparatus of the type generally employed to handle mixtures of solid materials. For example, the original laboratory scale experiments described herein were carried out in open vessels which were capable of being manually mixed (e.g., by "turning over" the material). Fixed bed reactors (e.g., metal trays) can simply be viewed as a larger version of the same type of apparatus. When fixed bed type reactors are utilized in the present method, the bed depth is generally not allowed to exceed more than about 3–4 inches in order to avoid the development of "hot spots" (locations within the bed having a substantially higher temperature— e.g., at least 10° C. hotter—than the average bed temperature) and/or anaerobic fermentation zones within the bed of incubating material.

When fixed bed-type reactors are employed in the present method, the bed of incubating culture medium is typically mixed and turned over on an intermittent basis on some regular schedule, e.g., once an hour. The mixing may be carried out manually, for example on a small scale (e.g., up to about one (1) kg of incubating culture medium) by using a spatula to stir and/or turn over the incubating material. As used herein, the term "stir" refers to a mixing motion which results in material being displaced laterally within the bed but remaining substantially within the same region (interior or exterior) with respect to the surface of the bed. The term "turn over," as employed herein, refers to a mixing motion which results in material being displaced between the interior and exterior of the bed (and vice versa). When the present fermentation is carried out on a larger scale under fixed bed conditions, such mixing may be accomplished using larger metal blades which move in a way with respect to a major axis of the bed.

Whatever manner of mixing is employed, it is preferable that the fermenting culture medium be mixed to allow sufficient exposure to an oxygen-containing gas, such as air (the typical bath gas), to maintain aerobic fermentation conditions. This is best achieved by incubating the culture medium in an apparatus that permits mixing to be carried out in a low shear manner. As discussed above, the amount of shear to which the incubating medium is subjected is preferably not sufficient to transform the material into a paste like consistency.

A variety of reactor configurations including stirred tank reactors, fluidized bed reactors, packed bed reactors may be employed in the present process. The entire reaction may be performed in a single vessel having appropriate mechanisms to control the temperature and aeration of the culture medium as well as having the capability of drying the modified oilseed product. Alternatively, different processing steps may be performed in separate reaction vessels. For example, after combining the culture medium with water in a mixer to achieve the desired moisture level, the moistened material may be transferred to a second vessel to carry out the incubation (see, e.g., FIG. 7). Depending on the process design and equipment capabilities, the incubation product may be dried and ground in one or more additional pieces of equipment.

Advantageous overall choice of equipment and processing will depend, in part, upon selection, among the approaches, of the one which most readily facilitates an overall cost-effective and efficient processing scheme in large scale implementation. The considerations in selecting overall processes relate to design of the system to accommodate a number of objectives including one or more of the following:

1. Maintenance of desired temperature and aeration conditions of the incubating culture medium;
2. Maintenance of the incubating culture medium within a desired particle size range;
3. Maintenance of the incubating culture medium within a desired range of moisture content;
4. Capability of inoculating the oilseed based culture medium prior to incubation with a defined microbial population;
5. Capability of drying the incubation product to a level of no more than about 15 wt. % moisture;
6. Removal of any unwanted gaseous byproducts; and
7. Capability of granulating the dried modified oilseed product to a granular material of desired particle size.

In addition to fixed bed reactors, a number of other conventional apparatus may be utilized to carry out the present method. Suitable examples of such apparatus include plow-type mixer/dryers, desolventizer-toaster dryers, plate dryers, belt dryers, rotary drum dryers, Nauta-type mixers (which include a precessing screw in a conical tank), perforated floor malting chambers and hollow screw processors. Such mixing apparatus are typically capable of heating and maintaining the temperature of the incubating material within a desired range (e.g., about 40 to 50° C.) as well as mixing the material in a low shear manner.

Figure 7:
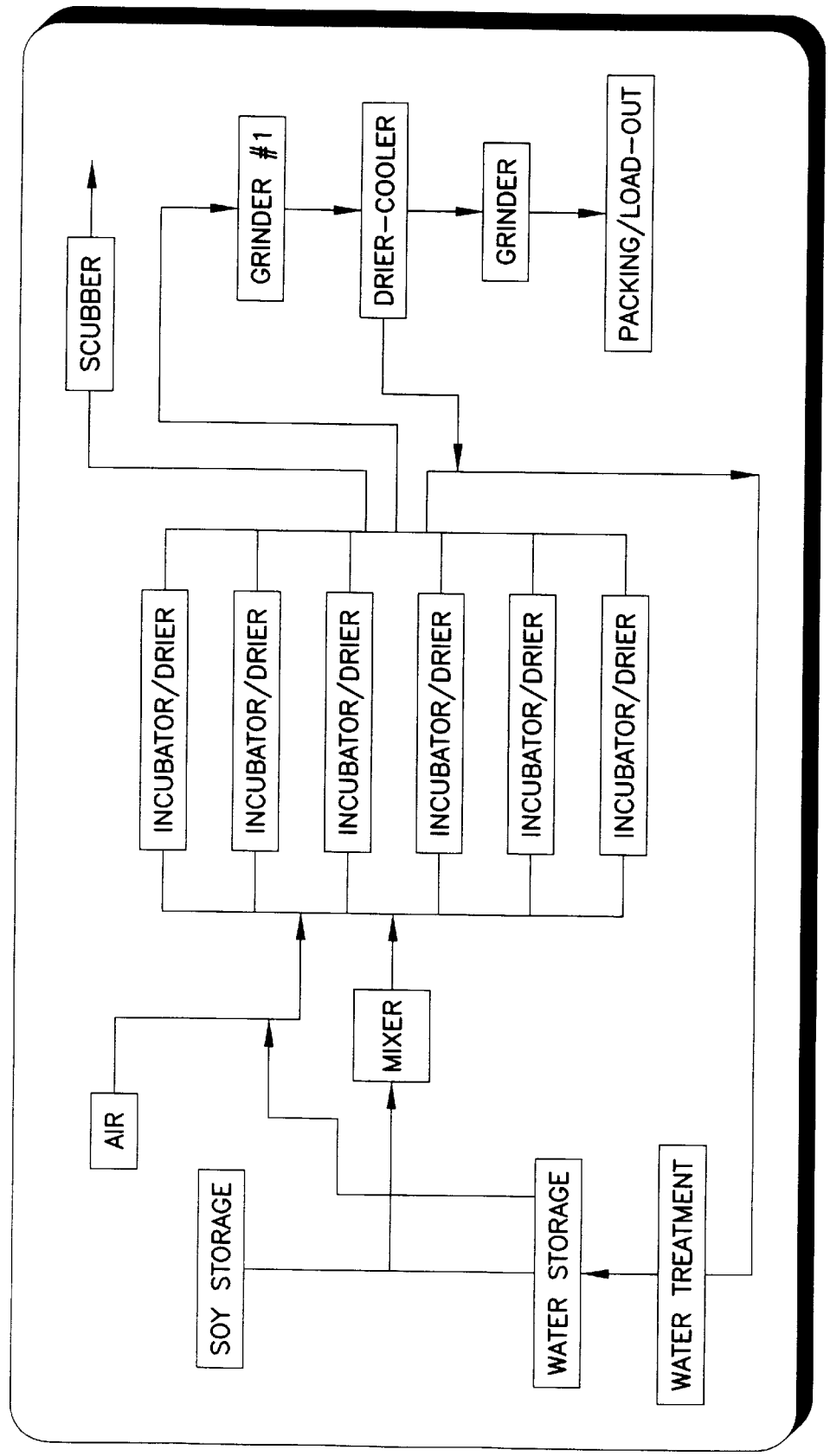
FIG. 7 is a schematic drawing of an exemplary manufacturing process for producing a modified soy meal product according to the present invention.

FIG. 7 shows one example of a system which may be used to produce a modified oilseed material according to the present method. Oilseed material, such as soybean meal, is transferred from a storage section (marked "soy storage") into a mixer together with the appropriate amount of water to produce an oilseed material having a moisture content of about 30 to about 60 wt. %. Once this material has been mixed to a relatively uniform consistency, the moisturized oilseed material is transferred to a set of incubator dryers. While the incubation and initial mixing steps are shown in FIG. 7 as being carried out in separate sections of the system, in some systems the mixing and incubation may be carried out in a single apparatus (e.g., a plow mixer/dryer).

While the moisturized oilseed material is being incubated in the incubator/drier sections of the system, air is typically supplied to the incubator/drier sections (generally in a continuous fashion). The air is preferably humidified, e.g., by spraying a fine mist of water into the flowing air stream. The flow of air through the incubator/drier sections serves to aid in maintaining the fermentation under aerobic conditions as well as preventing the buildup of unwanted gases (e.g., ammonia and other volatile amines) during fermentation. The air flow is generally passed through a scrubber before being vented from the system. To enhance the overall efficiency of the system, water may be recovered from the effluent air and recycled, after treatment to remove any undesirable byproducts of the fermentation, back to the input side of the system (via the water treatment and water storage sections of the system).

In the system shown in FIG. 7, the modified oilseed material produced by the incubation process is typically initially dried in the incubator/drier sections before being subjected to a first grinding step ("Grinder #1"). The partially dried, coarsely ground material is then typically dried further (in the "Drier-Cooler") and subjected to a second grinding step before being packaged for shipping. In some embodiments of the invention, depending on the equipment being employed, at least some portion of the drying and grinding of the incubation product may be carried out in the same portion of the system used for the incubation step (e.g., when a plow mixer/drier is used for the fermentation process). Quite typically, however, partially dried product is transferred to another section of the system to complete the drying process and to grind the dried product to the final desired particle size.

Another suitable process configuration includes a plow reactor. Reactors of this type typically includes a vessel equipped with a mechanism for mixing the incubating the culture medium in a low shear manner. One example of such a reactor includes a cylindrical fermentation vessel containing a screw-type plow blade attached to a shaft positioned along the central axis of the cylinder. The plow blade is preferably can be controlled to rotate in an intermittent fashion at a rotation speed which is sufficient to "turn over" the incubating culture medium without breaking the oilseed material up into particles which form a paste-like material (at the desired water content of about 30 to about 60 wt. % moisture). The shear imparted by the screw-type plow blade is typically sufficient to crumble any oilseed material originally present in the form of flakes (e.g., desolventized oilseed white flakes) into a granulated material having a particle size similar to that of an oilseed meal like soybean meal. For example, after intermittently mixing a culture medium make up from desolventized soybean white flakes for about 8–10 hours in an apparatus of this type, the bulk of the defatted oilseed material is typically broken down into a granular form. The modified oilseed product produced by the incubation process can be pasteurized, dried and granulated to some extent simply by raising the temperature (e.g., to about 75° C.) while mixing the material in a continuous fashion in a higher shear manner that results in the material being broken up into a granulated form.

The invention will be further described by reference to the following examples. These examples illustrate but do not limit the scope of the invention that has been set forth herein. Variation within the concepts of the invention will be apparent.

Analytical Methods
Protein/Free Amino Nitrogen

Protein was analyzed using the Kjeldahl or Leco procedures, or near-infrared (NIR) spectroscopy. Lysine (total and available) was analyzed using standard methodology.

The level of free amino nitrogen (FAN) was determined using the ninhydrin method (see e.g., European Brewery Convention, 1987). Solid samples of oilseed material were extracted with water. In solution, each sample was diluted as needed to obtain 1–3 mg/L FAN. The diluted samples were reacted with a buffered ninhydrin solution in a boiling water bath for 16 min. After cooling in a 20° C. water bath for 10–20 min, the samples were diluted using potassium iodate in a water/ethanol solution. Within 30 min of this treatment, the absorbence at 570 nm was measured versus a control solution containing water but otherwise treated like the samples. The FAN level was calculated from a standard line using glycine at various concentrations as the reference.

Protein solubility measurements were carried out by suspending each sample (0.9g) in 20 mL deionized water and adjusting the pH of the resulting slurries to 5 or 7. The slurries were then autoclaved (121° C., 15 lbs pressure, 15 min), cooled and centrifuged at 20,000× g for 15 minutes. Using the Kjeldahl method, the intact sample and the resulting supernatant were analyzed for protein, and the % soluble protein was calculated.

The viscosity of solutions was determined before and after autoclaving. Solids were mixed with water on a 20% solids (as is) basis and the pH of the resulting compositions were adjusted to 5 or 7. The viscosity of each pH adjusted composition was measured using a Brookfield viscometer. The solutions were then autoclaved at 121° C. (15 lbs pressure) for 15 minutes, cooled to room temperature and the Brookfield viscosity was measured again for the autoclaved material.

Soluble Sugars

Soluble sugars (sucrose, stachyose, raffinose, glucose) were separated and quantified by high-pressure liquid chromatography (HPLC) after aqueous extraction from the sample matrix and appropriate dilution. Soy extracts were prepared by thoroughly mixing 2 g of soy with 20 ml of deionized water in a 50-ml centrifuge tube, and shaking at 300 rpm for 20 min. After 5 min under static conditions, the extracts were centrifuged (3000 rpm; 10 min). An aliquot (4 ml) of each extract was diluted to 10 ml using pure acetonitrile. Following 30 minutes under static conditions, the resulting samples were filtered (0.45 micron), and injected into a Supelcosil™ LC-NH$_2$ column (Supelco, Inc., Bellefonte, Pa.) maintained at room temperature. Sugars were eluted from the column with a mixture of acetonitrile-H$_2$O (75:25), and at a flow rate of 2.5 ml/min. Sugars were detected using a refractive index detector. Known concentrations of commercial samples of each sugar were employed as standards.

Microbiological

Selected samples of modified soybean meal were tested for the presence of pathogens (*Bacillus cereus, Staphylococcus aureus, Clostridium perfringens,* and Salmonella), and staphylococcal enterotoxin using standard techniques.

Miscellaneous

Samples were analyzed for phytic acid and trypsin inhibitor by Woodson-Tenent Laboratories, Inc. (Memphis, Tenn.) using standard methodologies. Isoflavone analyses were performed using HPLC and photodiode array detection (Wang et al., *J. Agric. Food Chem.,* 42:1666–1673 (1994)).

EXAMPLE 1

25 g Scale Soybean Meal Fermentations

Soybean meal (25 g) was weighed into a 500-ml wide-mouth polyethylene bottle. Distilled water was added to yield a moisture level of 45%, and the contents shaken until the water was uniformly distributed. A ¼"-diameter hole was punched in the cap of each bottle to allow for air exchange, and the bottles were placed on their sides in a chest incubator. Water was added twice daily to the original level (based on weight), and the sample was mixed by shaking the bottle. The bottles were incubated at 40° C. for 1–3 days to allow for microbial growth and metabolic activity. Following incubation the temperature was raised to 75° C. for 10 min to pasteurize the product (i.e., stop both the microbial and enzymatic activities), and the contents of the bottle were transferred to Petri plates for drying at 50° C.

The rates of soluble sugar utilization and protein increase were monitored as a function of time during incubation of 25-g soybean meal samples at 40° C. and 45% moisture. Under these conditions, the soy soluble sugars (sucrose, stachyose, and raffinose) were essentially depleted within the first 6 hours of incubation at 40° C. and 45% moisture. The protein content of the soybean meal increased to 62.7% (dry basis) within 24 hours (see FIG. 1).

EXAMPLE 2
Effect of Mixing on Soybean Meal Fermentations

Soybean meal or flakes (454 g) was weighed into a 4-L Nalgene beaker, and warm (50° C.) distilled water was added to yield a moisture level of 45%. The water was uniformly distributed by mixing with a large spatula, and the beaker was loosely covered to reduce moisture loss. Water was added daily based on weight loss, and remixed with the spatula after each addition. The temperature and incubation times were as with the smaller samples. The 75° C. pasteurization and the 50° C. drying steps were done after spreading the samples out on trays. At the 1-lb (454 g) scale, soybean meal incubated at 45% moisture and 40° C. with periodic hand mixing showed loss of soluble sugars within the first 9 hours of incubation. The protein content of the material increased to 62% (dry basis as measured by NIR) after 48 hours (see FIG. 2A).

Figure 2A:
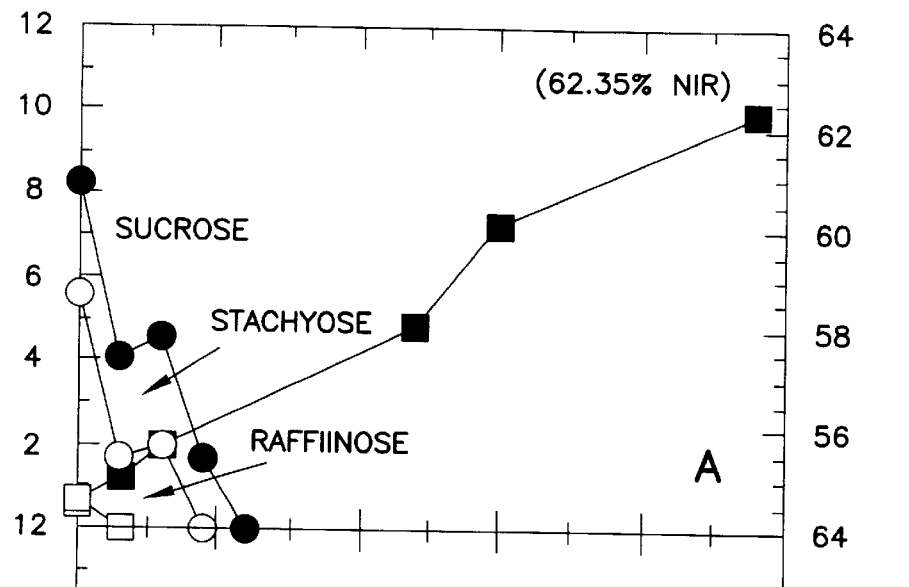
FIGS. 2A–2C are graphs showing the effect of different mixing regimes on soluble sugar loss and increase in protein content during the incubation of 1.0 lb batches of soybean meal at 40° C. and 45% moisture content. In graph 2C, the closed squares represent a batch mixed once during incubation while the open squares represent a batch which was not mixed at all.
Figure 2B:
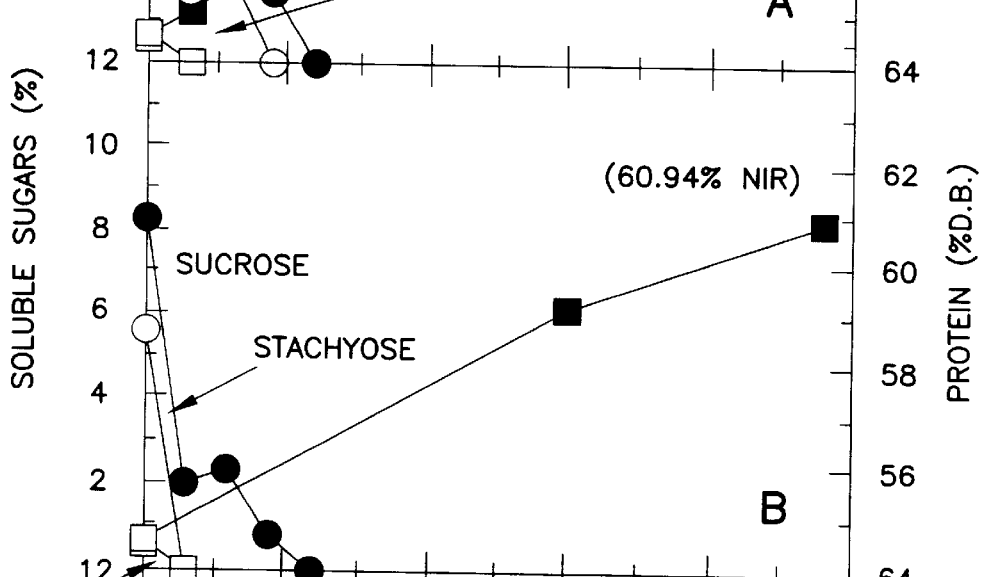
Figure 2C:
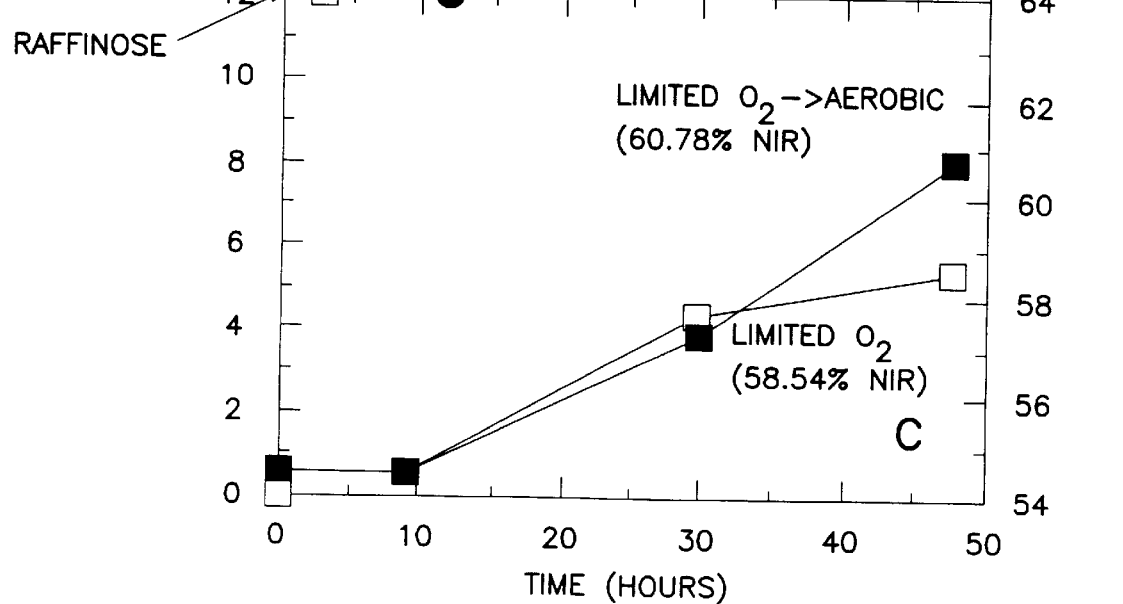

As shown in FIGS. 2A–2C, the rates of soluble sugar loss and protein increase varied with the mixing regime. Samples were mixed either (A) periodically (following 8 h and 24 h of incubation), (B) frequently (at hourly intervals during incubation), or (C) once (closed squares) or not at all (open squares) following incubation under a limited oxygen ($N_2$) atmosphere. Previous experimental work indicated that the microbial growth phase of the biological modification process was aerobic and required oxygen and that the type and degree of agitation used to provide the necessary aeration is critical to the success of the process. Proper aeration/agitation ensures that the desired inherent microbial population (sporeforming bacilli) dominates the fermentation. If conditions are allowed to become anaerobic, a lactic acid fermentation by lactobacilli results in an acidic endproduct. For the production of the modified soybean material, periodic gentle mixing (FIG. 2A) is preferable to either "hard" mixing (FIG. 2B), no mixing (FIG. 2C), or a combination of static/agitated (FIG. 2C) incubation conditions.

EXAMPLE 3
Effect of "Seeding" on Soybean Meal Fermentations

Figure 3:
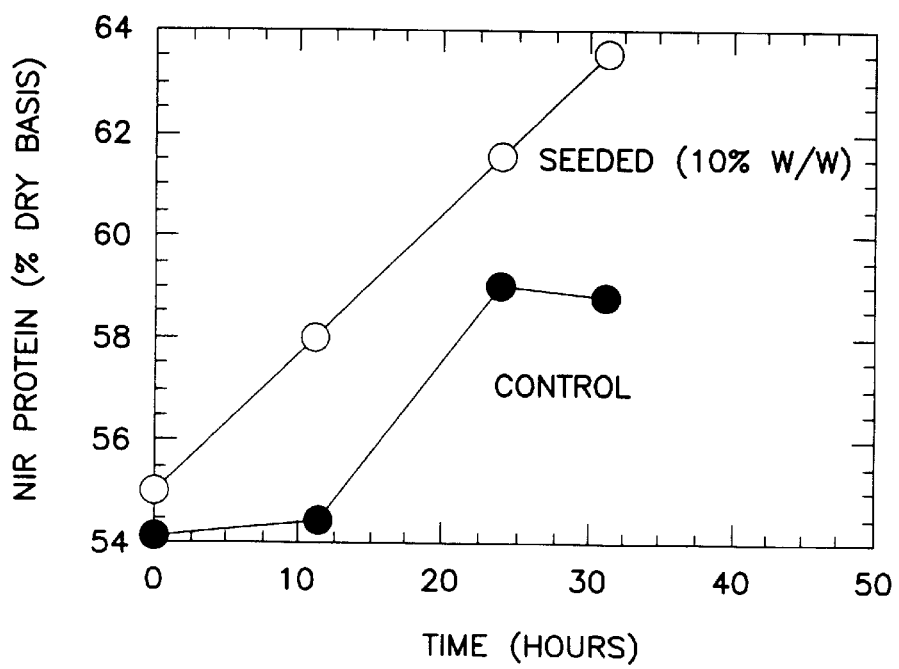
FIG. 3 is a graph showing the effect on the rate of increase in protein content during the incubation of a 1.0 lb batch of soybean meal at 40° C. and 45% moisture content of the "seeding" the batch with the product of an earlier run (63 wt. % protein (dry basis), pH 7.0–7.5).

In addition to maintaining proper conditions of aeration/agitation, "seeding" the soybean meal substrate with an aliquot of previously prepared product stimulates the rate of protein increase to produce a modified soybean meal. As shown in FIG. 3, adding 10% (w/w) dried "seed modified soybean meal" (generated by incubation in the laboratory in 25-g aliquots, dried, and mixed) to soybean meal upon water addition enhanced the rate of protein increase. "Seeding" allows for better control over the microbial population selected during the biological modification process. However, to ensure that the desired microbial population is selected for, the seed material must be carefully chosen. For example, each of three dried seed inocula—representing various final high protein products produced at either 25-g or 15-lb scale but each with a protein content of about 63% (dry basis) and a pH in the range of 7.0 to 7.5—was effective in stimulating the rate of protein increase compared to that observed with unseeded soybean meal. However, a dried seed inoculum with a protein content of 64% but a pH of 5.9 was inhibitory to the biological modification process. These results confirm that while seeding soybean meal prior to processing is desirable, the choice of "seed material" is critical to successfully produce an modified soybean meal by biological modification.

EXAMPLE 4
15 lb Scale Soybean Meal Fermentations

A tray (22.5×15.5 inch surface) sufficient in size to hold 14.2-lb of soybean meal wetted to 45% moisture at a bed depth of about 3 inches was obtained. It was configured with a perforated plate through which humidified air could be passed to aid in aeration and temperature control. Typically, 12.78 lb of soybean meal, 1.42 lb of "dry seed", and 8.52 lb of warm (40° C.) water was added to the tray and mixed gently by hand. The tray was transferred to a chest incubator set at 40° C. Once the meal bed reached 40° C. (after about 6 hours), the tray was transferred to ambient temperature for the duration of the incubation. During the remaining 16–20 hour period, the internal temperature of the meal mass was maintained at <50° C. and approximately 45% moisture by spraying water onto the meal surface to a constant weight, and gently "moving" the meal by hand. This allowed for both aeration and temperature control. The 75° C. pasteurization and 50° C. drying steps were carried out after spreading the material out on larger trays in a bed having a depth of about one (1) inch. The drying step could be carried out with a deeper bed of material, in which case the bed typically had to be intermittently mixed and the drying process required a longer period of time.

Figure 4:
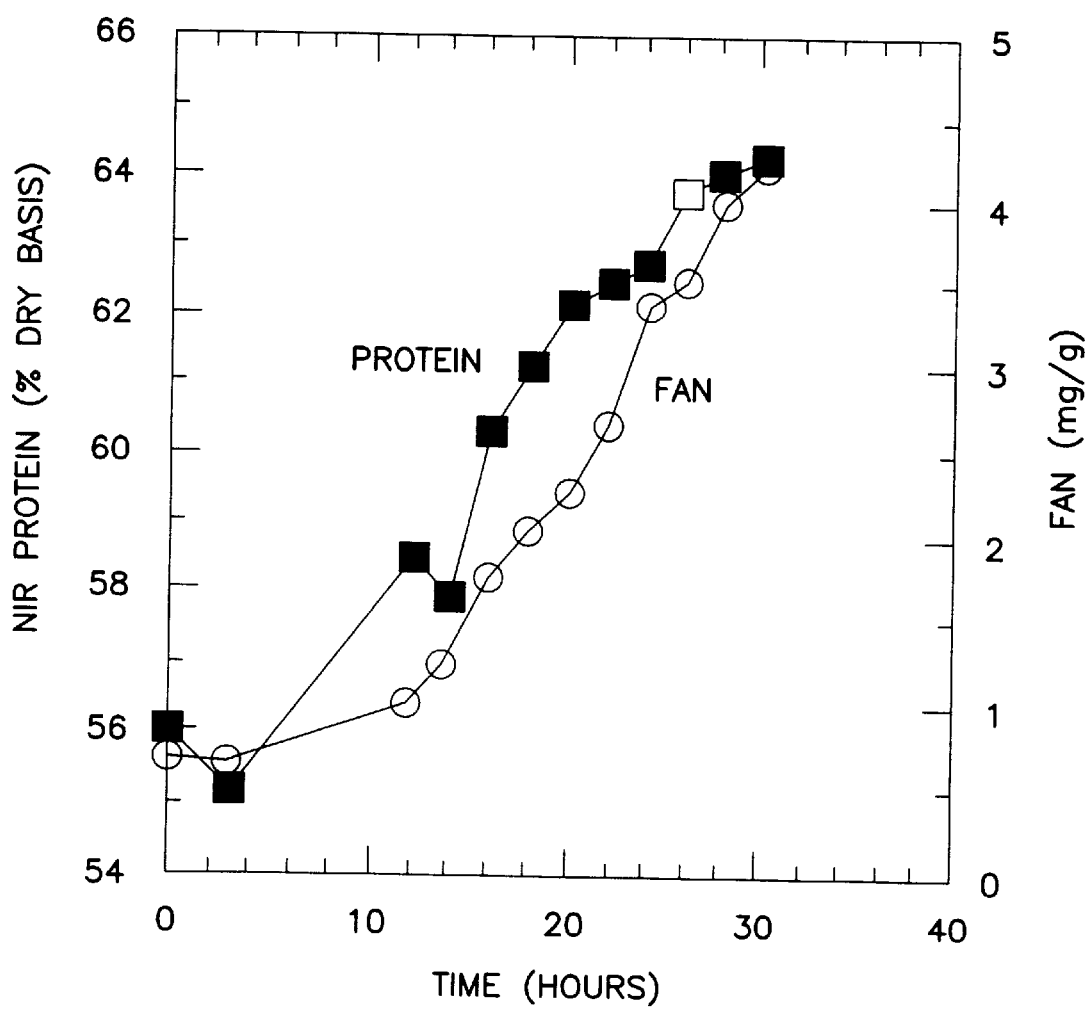
FIG. 4 is a graph showing a typical profile of the increase in protein and FAN content during the incubation of a 15 lb batch of soybean meal at 40–50° C. and 45% moisture content in perforated trays.

Time course experiments were conducted at 15-lb scale in the laboratory using the perforated tray. The soybean meal was "seeded" with a dried version of a modified soybean meal produced by incubating the indigenous microbial population of the meal (on 454 g. scale) for 2–3 days at 45% moisture and 40° C. Starting at 12 hours of incubation, samples were collected from the 15-lb scale incubation at 2 hour intervals until the material had been incubated for 30 hours. A typical profile is shown in FIG. 4. Without optimization, soluble sugars were depleted within 12 hours (no samples collected between 3 hours and 12 hours). Across the trays, protein concentration(as measured by Leco) increased from 56% (dry basis) in the native soybean meal to 63% (dry basis) or greater within the first 25–30 hours of incubation. Of interest also was that the FAN content rose from 0.68 mg/g in untreated meal to slightly over 4 mg/g at 28–30 hours (FIG. 4). This indicates that by employing a bed-type processing methodology at larger scale, it may be feasible to produce a soy product devoid of soluble sugars and with elevated levels of protein and FAN, but with much less slime formation than was observed with longer incubation times (e.g., 3–6 days at 25 g to 1 lb scale) to produce a high-FAN soy-based product. In the 15-lb tray experiments, monitoring was typically stopped after 30 hours (total incubation), since the material tended to become "agglomerated" and become more acidic (see FIG. 5). When this occurs, mixing and maintaining aeration of the incubating material becomes difficult.

Figure 5:
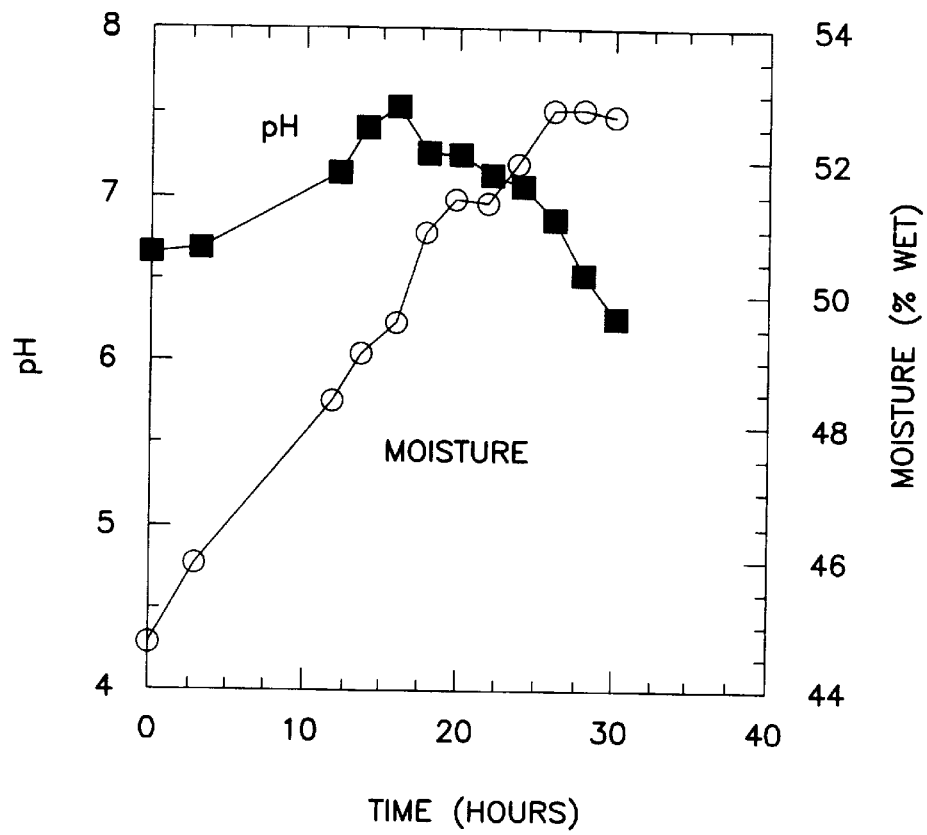
FIG. 5 is a graph showing the pH and moisture content during the incubation of a 15 lb batch of soybean meal at 40–50° C. in perforated trays.

Based on the results shown in FIG. 5, the moisture content of the meal was not constant during processing but rather increased during incubation from the initial 45% to approximately 53%. By maintaining the tray and its contents at a constant weight during processing (taking into account subsampling), the loss of solids resulted in an increase in moisture over time. Further investigation at 1-lb-scale confirmed that an increase in moisture during processing (from 45% to 51–53%) was preferable to a loss of water so as to maintain 45% moisture (data not shown). Characterization of the modified soybean meal produced in perforated trays resulted in an initial profile of the attributes of this product. Table 1 shows a summary of the attributes of the 24–28 hour modified soybean meal product produced in the 15-lb runs compared to other biologically-modified products and various controls.

Biologically modified soy as produced in the laboratory (incubation times ranging from 16 to 30 hours) was also analyzed for isoflavone content (see Table 2). Isoflavone values represent averages of duplicate analyses and are reported as total contents in micrograms isoflavone per gram sample dry weight (ug/g). The columns show the sums of the individual isomers of each isoflavone—daidzein, genistein, and glyceitein—normalized for their molecular weight differences to give the total isoflavone concentrations.

The results indicate that the biological modification of soybean meal to produce a high protein product does not destroy the total isoflavone content of the soy. This is in contrast to commercial soy protein concentrate production processes (chemical or enzymatic) which tend to strip the soy of isoflavone components (see, e.g., Promine® SPC, a functional soy concentrate, and Procon® SPC, a non-functional soy concentrate). In addition, the results for the individual isomers of each isoflavone demonstrate that the microbial processing had less of an effect on the total isoflavone content than it did on the distribution of the isoflavone isomers.

Since the present method involves a biological process, a potential concern is the microbiological safety of the modified soybean meal product. Some microorganisms known to exist in soy are potential food pathogens. To confirm the microbiological safety of the modified soybean meal products prior to their being tested in the piglet soy screening study, the two batches to be employed in this study were subjected to microbiological analysis. Modified soybean meals #1 and #2 prepared in separate trays incubated for 30 hours (pH=5.79) and 20 hours (pH=7.32), respectively.

As shown in Table 3, although the microbial load was relatively high, three potentially problematic organisms (*Bacillus cereus, Staphylococcus aureus*, and *Clostridium perfringens*) were each only detected at low levels or were below the detection level of the assay. The higher level of presumptive *B. cereus* observed in modified soybean meal #2 suggests that it is preferable to process soybean meal until its pH becomes acidic. In addition, both samples were negative for staphylococcal enterotoxin and for Salmonella.

EXAMPLE 5

83 lb Scale Soybean Meal Fermentations

A plow mixer/vacuum dryer was identified as a suitable apparatus to produce a larger prototype sample of modified soybean meal. Its operation mimics the periodic mixing/aeration used during the tray experiments, and allows for control of the processing parameters of temperature and moisture.

The soybean meal fermentation was scaled up to 83-lb ("wet" substrate corresponding to about 50 lb product on a dry basis) in a 4.6 ft.$^3$ plow mixer/vacuum dryer. The plow mixer was preheated to 50° C. and 46.69 lb of soybean meal was added together with 5.19 lb of dried "seed meal." With the plow blades mixing the material, the meal/"seed meal" mixture was wetted to achieve an initial moisture content of 45% by spraying on 31.1 lb of warm (60–70° C.) water. Mixing was continued for approximately 3 min. The mixer was then shut off and the soybean meal was allowed to incubate for 35–40 hours with intermittent mixing while maintaining the jacket temperature at 50° C. (and an internal temperature of at least 40° C.). During the incubation period, the contents were mixed once every 17 minutes by the plows being activated for 1 second at a speed setting corresponding to 60 rpm. Air flow rates through the head space in the unit (and over the internal contents) was maintained at a slow rate with the entire unit being held at 4–5 psi backpressure by a bleeder valve.

After the 35–40 hour incubation period, the jacket temperature was raised to about 90° C. and a vacuum of 25–26 mm Hg was established. The contents were mixed at 60 rpm for the initial 3 hours of the pasteurization/drying period. The jacket temperature was then lowered to approximately 75° C. and the contents were mixed at 110–120 rpm for the period of time necessary to convert the material to a granular form (typically 2–3 hours under 25–26 mm Hg vacuum) having approximately 11–14% moisture. The contents were then discharged from the mixer/dryer and further ground to a particle size of finer than 10 mesh.

Over the course of a two-month period, twenty runs were performed in the plow reactor, and approximately 800-lb of modified soybean meal was accumulated. All individual batches were blended, and the protein content of the composite product was analyzed by Leco to be 60.8% (dry basis).

Figure 6:
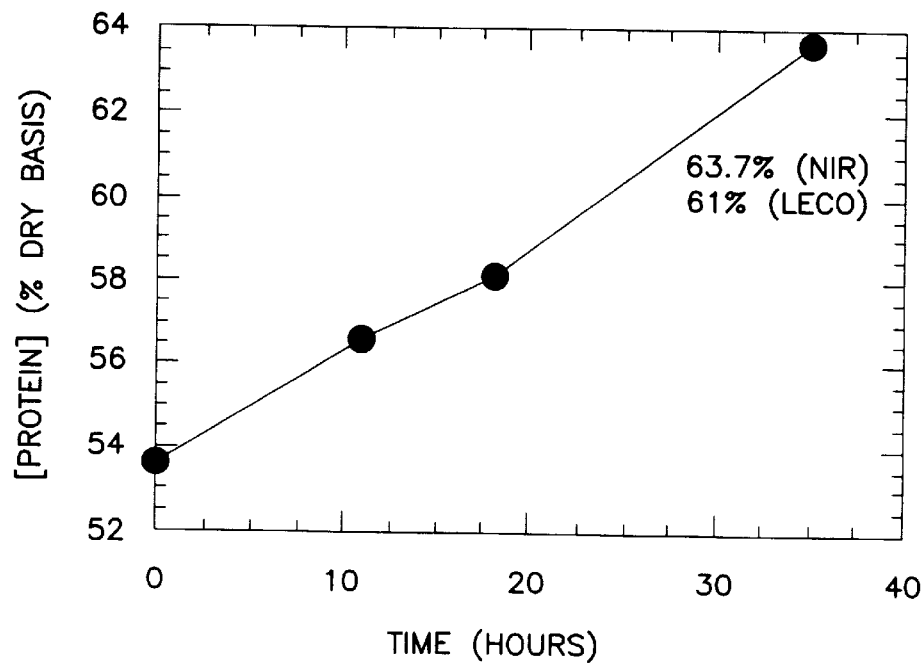
FIG. 6 is a graph showing the increase in protein content during the incubation of a "seeded" 83 lb batch of soybean meal at 40° C. and 45% moisture content in the plow mixer/dryer.

FIG. 6 illustrates a typical plow mixer production profile. In this production run, an 83-lb batch of soybean meal/"seed" was incubated at 45% moisture and 40–50° C. with periodic mixing for 30–35 hours. Under these conditions, the soy soluble sugars were depleted, and the protein content of the soybean meal increased from about 53% to 63% (dry basis). Since protein content was the main desired attribute of the modified soybean meal, NIR was adopted as a rapid means of estimating protein concentration. Its calibration was done using samples of modified soybean meal that were prepared in the laboratory. Over a range of samples, the average protein on a dry basis using NIR analysis was 60.58% compared to 60.77% using Leco/oven moisture analysis—thus suggesting good agreement between the two methods. However, the two methods did not show good agreement when used to analyze products produced on larger-scale in the plow mixer, especially during later stages of processing (see FIG. 6). The reason for this is unclear but it may be that with increased processing time the tendency for acid production (as indicated by the drop in pH) affects the amount of carbon that is volatilized as $CO_2$, and thus the apparent protein.

To determine whether on the pilot-scale (83-lb) the process variables of temperature and moistures significantly affect the rate of protein increase, both variables were tested at two levels over four runs—30° C. and 50° C., and 38% and 52%, respectively. As expected, both of these variables did influence the time required to achieve high protein. The combination of 50° C. and 52% moisture allowed for 62.7% (dry basis) protein (as measured by NIR) within 24 hours. In comparison to the 35–40 hours required in the plow mixer at 40° C. and 45% moisture, the processing time of 24 hours resulting from running the fermentation at a slightly higher temperature and moisture level more closely resemble the processing times for achieving 63% (dry basis) protein in the perforated tray experiments (15-lb).

The "starter meal" used to seed the meal was prepared in separate runs in the plow mixer. Instead of allowing the fermentation to run the complete 30–35 hour, incubation was stopped after approximately 15 hours and the product was immediately dried. The pH of dried "starter meal" produced by such a method was always>7 which—as discussed earlier—was deemed preferable to an acidic pH for seeding purposes. However, since the seed was stored and subsequently used as a dried material, the microorganism(s) responsible for the biological modification process was present as spores rather than as viable cells. Given the proper conditions of moisture, and temperature, and a nutrient-rich substrate, the spores will germinate into viable, metabolically active cells. Thus, the use of dried "seed meal" is associated with a lag period during before which the spore-forming bacillus becomes active to promote the biological modification of fresh soybean meal.

To determine whether a "viable" or "live" seed culture allowed for a faster processing time (i.e., reduced the lag time associated with spore germination and the subsequent increase in protein), a "continuous" run was performed in the plow mixer. For this purpose, a typical 83-lb production run was started but at 16.5 h the entire contents (representing "live" modified soybean meal "seed") were discharged from the plow mixer. The mixer was then immediately recharged with fresh soybean meal (46.7 lb) and water (28 lb), and seeded with the "live" seed (10% w/w) just previously removed from the apparatus. Processing continued as per usual with samples being collected periodically over the next 24 h.

The "live" seed significantly reduced the processing time so that maximum protein was obtained within only 14.75 hours of processing, in comparison to the 30–35 hours typically required when dried seed meal was used. Thus, it appears that incorporating a live ("active") seed meal can increase the initial rate of the fermentation process and shorten the overall incubation time.

In total, about 800-lb of prototype modified soybean meal was produced in 50-lb (dried) batches (corresponding to 83-lb "wet" batches) and blended to produce a composite modified soybean meal product. This prototype product was analyzed for its various attributes (see Table 1), and its microbiological safety (see Table 4) was verified prior to its being fed to animals in a feeding trial. The attributes of the prototype product were compared to two commercial soy based protein supplements—Procon® and Soycomil®. Procon® SPC is a commercial soy protein concentrate ("SPC") of food grade and served as the benchmark product for the laboratory phase of this study. Soycomil® P is a commercial soy protein concentrate ("SPC") used in animal feed rations.

EXAMPLE 6
Piglet Acceptability Feeding Study

A preliminary feeding study was carried out to determine the palatability of the modified soybean material (produced according to the procedure described in Example 3) when incorporated into a post-weaning feed ration of young pigs. Twenty-four piglets at weaning were stabilized by being fed a common, highly palatable diet from weaning to 3 days post-weaning. Beginning at 3-days, the pigs were fed either a control diet (textured soy concentrate) or one of two test diets: test diet #1 (modified soybean meal of pH 5.8) or test diet #2 (modified soybean meal of pH 7.3). These test diets were formulated to the same digestible amino acid and metabolizable energy (assuming similar amino acid digestibilities for all soys), and contained about 20% modified soybean meal or 17.6% commercial soy protein concentrate ("SPC"). The trial involved two 4-day test periods in which after 4 days on the control diet the piglets were switched to a test diet (12 piglets per comparison). In an attempt to control variation, there was also a pair feeding component to the trial (6 pigs per diet) with crossover after 4 days.

Two samples of modified soybean meal were tested in a small palatability study (single stimulus assay) with piglets and served to provide a sense of the attractiveness of the product from a purely unbiased palatability perspective as part of a feed ration. This preliminary feeding trial showed generally positive tends relative to a commercial soy protein concentrate. No intestinal upset was noted. Pigs on the control diet adapted poorly and lost weight over the first 4 days (−0.2 lb per day), while pigs on the test diet gained 0.4 lb per day. After the switch, pigs on the control diet gained 0.15 lb per day, while pigs on the test diet gained 0.4 lb per day. Feed intake was the same for all diets. The feed conversion ratio (FCR) for the control diet was 2.0 compared to 1.5 for the test diet. However, due to the poor performance of a few pigs on the control diet, this difference may not be significant. Based on the results of this preliminary trial, the following tentative conclusions were drawn: the palatability of the test products was acceptable; the bioavailability of the protein in the modified soybean meal was at least equivalent to commercial soy protein concentrate.

The invention has been described with reference to various specific and preferred embodiments and techniques. The invention is not to be construed, however, as limited to the specific embodiments disclosed in the specification. It should be understood that many variations and modifications may be made while remaining within the spirit and scope of the invention.

TABLE 1

Characterization of Modified Soybean Meal and Related Products

| Attribute | Soybean Meal | Composite Modified Soybean Meal (83-lb Runs) | Procon$^R$ SPC | Modified Soybean Meal (15-lb 24–28 h product) |
|---|---|---|---|---|
| Free amino N (FAN) (mg/g) | 0.6 | 1.2 | 0.3 | 3.38 |
| Protein (% as is) | 48.0 | 53.9 | 61.0 | 58.6 |
| Protein (% dry basis) | 54.5 | 61.1 | | 63.9 |
| Protein solubility (% autoclaved) | | | | |
| pH 5 | 15 | 8 | 15 | 25 |
| pH 7 | 68 | 21 | 67 | 60 |
| Viscosity (cps, autoclaved, 20% solids) | | | | |
| pH 5 | 725 | 275 | | |
| pH 7 | 890 | 780 | 938,000 | |
| Viscosity (cps, 20% solids) | | | | |
| pH 5 | 675 | 245 | | |
| pH 7 | 525 | 245 | | |
| Protein Dispersibility Index ("PDI") in % | 25 | 6 | — | — |
| Lysine (% as is) | | | | |
| Total | 2.99 | | | 3.21 |
| Available | 2.84 | | | 3.03 |
| Oligosaccharides (%) | | | | |
| Sucrose | 8 | 0 | 0.2* | 0 |
| Raffinose | 0.7 | 0 | | 0 |
| Stachyose | 5.1 | 0 | | 0 |
| Fat (%) | 0.7 | 0.5 | — | — |
| Ash (%) | 6 | 6.3 | — | — |
| Trypsin Inhibitor (TIU/g) | 3,500 | 1,200 | 19,000 | 1,700 |
| Phytic acid (wt. %) | 1.35–1.74 | 1.64 | 2.37 | 2.19 |

*Total soluble sugars according to Central Soya product literature.

TABLE 2

Isoflavone Content* of Modified Soybean Meal and Related Commercial Soy Protein Products.

| Sample | Daidzein | Genistein | Glycitein | Total Isoflavone |
|---|---|---|---|---|
| Soybean Meal Biologically-Modified | 1122 | 1417 | 190 | 2729 |

TABLE 2-continued

Isoflavone Content* of Modified Soybean Meal and Related Commercial Soy Protein Products.

| Sample | Daidzein | Genistein | Glycitein | Total Isoflavone |
|---|---|---|---|---|
| Soy Meal | | | | |
| 16-h product | 1042 | 1312 | 211 | 2565 |
| 24-h product | 939 | 1209 | 192 | 2340 |
| 30-h product | 1020 | 1376 | 214 | 2610 |
| Commercial Soy Concentrates | | | | |
| Promine$^R$ (functional) | 26 | 47 | 0 | 73 |
| Procon$^R$ (non-functional) | 29 | 49 | 0 | 78 |

*ug/g

TABLE 3

Microbiological Analysis of Modified Soybean Meal

| Analysis | modified soybean meal #1 | modified soybean meal #2 |
|---|---|---|
| Aerobic plate count* per gram | 13,000,000 | 6,100,000 |
| Coagulase-positive Staphylococci per gram | <10 | <10 |
| Yeast per gram | <10 | <10 |
| Molds per gram | <10 | <10 |
| Presumptive *Bacillus cereus* per gram | 1,900 | 11,000 |
| Presumptive *Clostridium perfringens* per gram | <10 | <10 |
| Staphylococcal Entertoxin (EIA) | Negative | Negative |
| Salmonella (EIA method on 25-g sample) | Negative | Negative |

*Estimated.

TABLE 4

Microbiological Analysis of Composite Modified Soybean Meal.

| Analysis | Composite Modified Soybean Meal |
|---|---|
| Aerobic plate count* per gram | 10,000,000 |
| Coagulase-positive Staphylococci per gram | <10 |
| Yeast per gram | 220 |
| Molds per gram | <10 |
| Presumptive *Bacillus cereus* per gram | 1,900 |
| Presumptive *Clostridium perfringens* per gram | <10 |
| Staphylococcal Entertoxin (EIA) | Negative |
| Salmonella (EIA method on 25-g sample) | Negative |

*Estimated.

What is claimed is:

1. A method for preparing a modified oil seed material comprising:
   incubating culture medium, which includes oil seed material and microorganisms, at a temperature within the range of about 25° C. to about 60° C. in the presence of oxygen for about 1 to 3 days to form a modified oil seed material having a protein content which is at least about 5 wt. % higher on a dry basis than the seed material before said incubating, wherein the culture medium has a water content of about 30 to about 60 wt. %.

2. The method of claim 1 wherein the modified oilseed material has a protein content of at least about 55 wt. % on a dry basis.

3. The method of claim 1 wherein the incubating step comprises intermittently mixing the culture medium.

4. The method of claim 1 wherein the oilseed material includes defatted oilseed material.

5. The method of claim 4 wherein the defatted oilseed material includes flash desolventized soybean white flake.

6. The method of claim 4 wherein the defatted oilseed material includes toasted soybean white flake.

7. The method of claim 1 wherein the incubating step comprises incubating the oilseed material in the presence of an oxygen-containing gas.

8. The method of claim 1 wherein the incubating step comprises inoculating the culture medium with a microbial inoculate.

9. The method of claim 8 wherein the microbial inoculate includes bacteria.

10. The method of claim 8 wherein the microbial inoculate includes spore forming bacteria.

11. The method of claim 8 wherein the microbial inoculate includes oilseed material previously modified according to the method of claim 1.

12. The method of claim 8 wherein the microbial inoculate includes an activated microbial source.

13. The method of claim 1 further comprising heating the modified oilseed meal at a temperature of at least about 75° C. for a sufficient time to form a pasteurized oilseed meal.

14. The method of claim 13 further comprising drying the pasteurized oilseed meal to form a dried modified oilseed meal having a water content of no more than about 15 wt. %.

15. The method of claim 14 further comprising granulating the dried modified oilseed meal to form a granulated modified oilseed meal.

16. The method of claim 1 wherein the culture medium further comprises a second carbohydrate source, a second nitrogen source or a mixture thereof.

17. The method of claim 1 wherein the microorganisms include bacteria.

18. The method of claim 17 wherein the bacteria include spore forming bacteria.

19. The method of claim 1 wherein the microorgansims are indigneous to the oilseed material.

20. The method of claim 1 wherein the culture medium is incubated at a pH of about 6.0 to about 7.5.

21. The method of claim 1 wherein the culture medium is incubated for about 25 to 30 hours.

22. The method of claim 1 wherein the culture medium is incubated for about 30 to 35 hours.

23. The method of claim 1 wherein the culture medium is incubated for about 35 to 40 hours.

* * * * *